Patented June 6, 1939

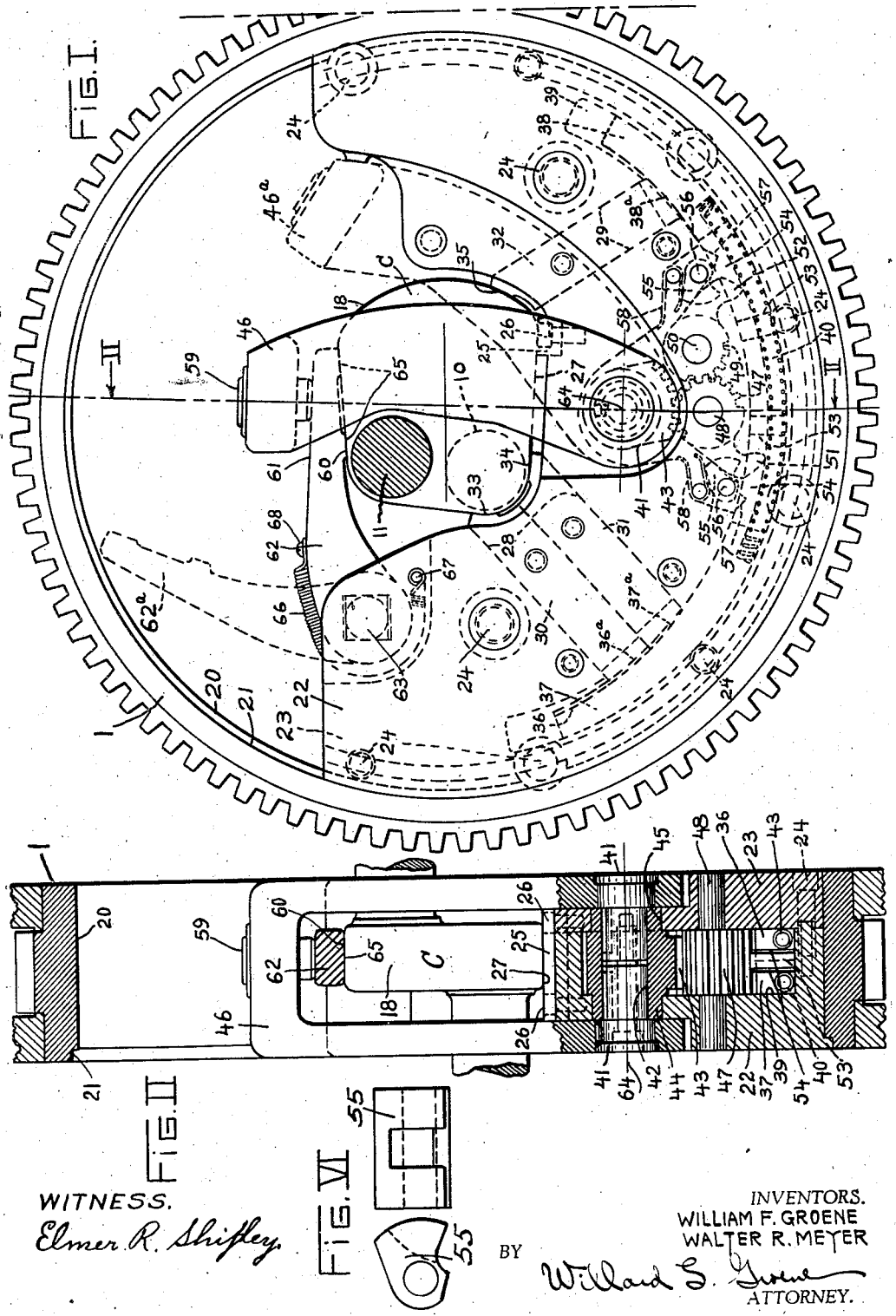

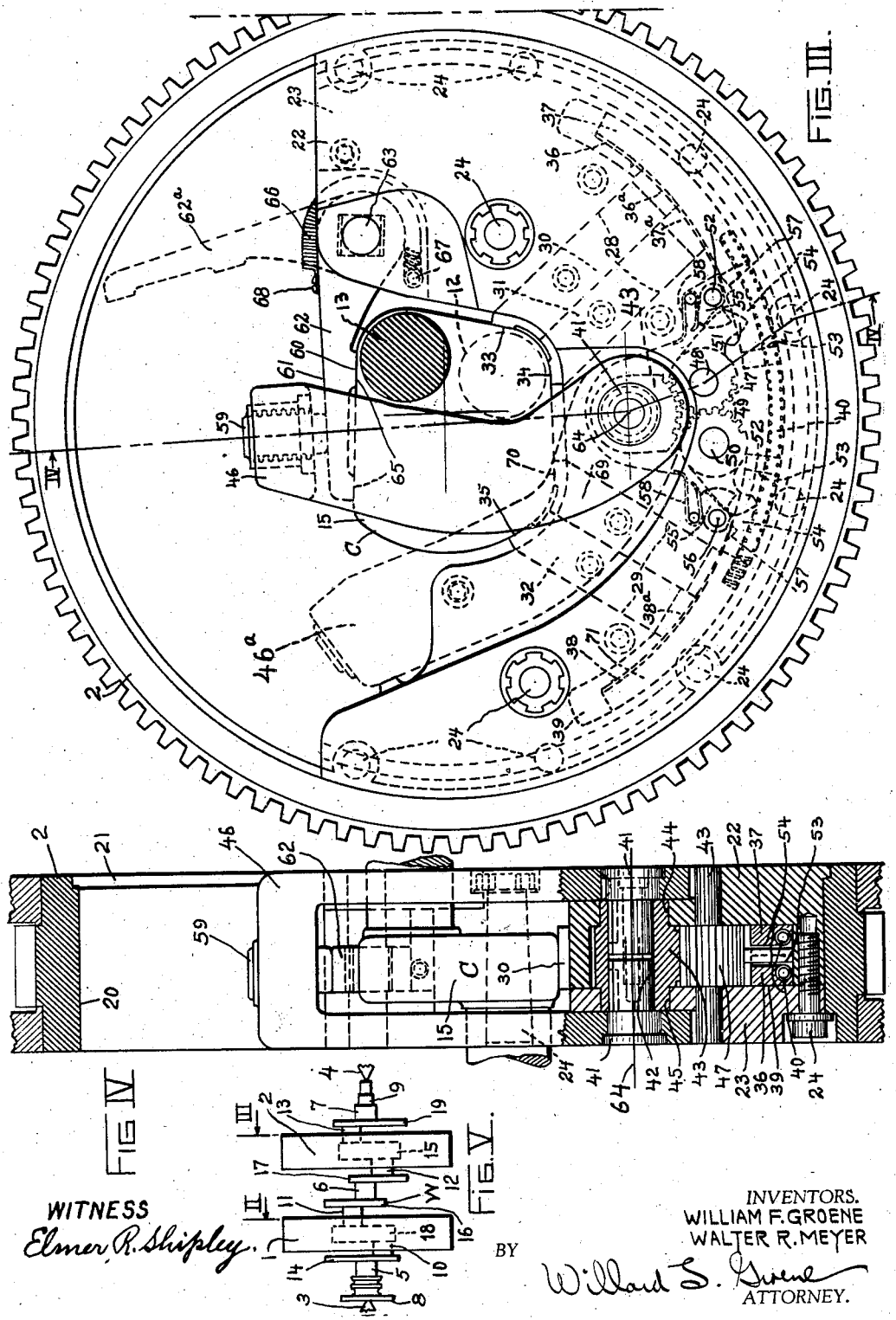

2,160,967

UNITED STATES PATENT OFFICE 2,160,967

CRANKSHAFT CHUCK

William F. Groene and Walter R. Meyer, Cincinnati, Ohio, assignors to The R. K. Le Blond Machine Tool Company, Cincinnati, Ohio, a corporation of Delaware Application June 7, 1938, Serial No. 212,326

18 Claims. (Cl. 82—40)

This invention pertains to chucks for gripping irregular rough surfaced work pieces which have been properly pre-located with respect to the axis of rotation of the chuck. More particularly this invention pertains to chucks for gripping the rough surfaces of the webs of crankshafts to be chucked and rotated in a crankshaft lathe, for instance, of a character shown in Patent No. 2,069,107 issued January 26, 1937.

It has long been a difficult problem to chuck a rough irregular surfaced precentered work piece and maintain said workpiece during machining operations in its proper precentered position in a lathe. Particularly is this problem difficult in lathes of the center drive type wherein the work is first placed on the usual lathe centers and the center drive chuck then applied to the work intermediate said centers. In such instances the chuck is found to invariably axially displace the work piece from true centered position which causes the machining operation on the work to be inaccurate when the work is again unchucked. Various forms of equalizing chucking devices have been suggested to meet this problem but all have been defective because any chuck which has equalizing characteristics cannot positively hold work from axial distortion caused by the cutting tools which distortion is particularly encountered in turning the crankshaft.

With these former difficulties clearly in mind we have conceived the idea that if a series of equalizing plungers could be engaged on a work piece with a predetermined initial pressure insufficient to distort the work from its prelocated position; then to provide means for automatically locking said plungers, while so engaged, to the chucking device, the rough irregular work piece could then be positively and rigidly held in true position in the chuck so that all machining operations undertaken on the crankshaft could be accomplished without distorting it from its true precentered position. Since, as is well known in the art, a crankshaft held on centers is very limber and may be easily distorted or bent axially with a relatively small application of pressure intermediate the ends of the crankshaft, it was necessary to design a chucking device having engaging means for contacting the rough webs of the shaft which firmly seated themselves on the webs but which did not, when so initially seating themselves distort the shaft from its true precentered position. These engaging means had to be so arranged that when they were locked up with the rotary chuck body that they formed rigid engaging abutments properly contacting the rough surfaces of the crankshaft webs to securely hold the crankshaft under all conditions of the cutting operations.

It has also been a major difficulty in the past with chucks of this character to provide adequate bearing contact for the gripping plungers on the rough surfaced work piece because loose surface material and scale which is ever present on these surfaces would determine the initial setting of the plungers just prior to their being locked to the chuck body. The result was that when the cutting operations were started these surface defects would crush down and cause looseness between the gripping plungers and the work and would invariably loosen the clamping mechanism of the chuck allowing the work to move around therein which, of course, resulted in inaccurate and damaged work. To overcome this difficulty we have provided means for rapidly engaging the plungers with the work surface in hammer blow fashion to remove and crush such foreign substances on the work surface to thus form an adequate bearing contact for the plungers and without appreciably distorting the work from its true precentered position.

An object of this invention is to provide a chucking device with means for engaging and supporting a rough irregular work piece in a prelocated position in a chuck in conjunction with immovable positive means for driving the crankshaft when so held.

Another object of this invention is to provide in a double center drive lathe, a pair of chucking devices each adapted to engage a rough, irregular prelocated work piece to support it in said chucking devices and means for positively driving said crankshaft when held in said chucking devices.

Another object of this invention is to provide in a chucking device adapted to support and rotate a rough irregular pre-located work piece in a lathe, a series of plungers moving perpendicular to the axis of rotation of the chucking device and work piece to be gripped, said plungers being adapted to engage the rough irregular surface of the work piece with a predetermined relatively small pressure and to provide means in conjunction with said plungers for automatically locking them in said engaged position for securely holding said work piece when clamped in said chucking device.

Another object of this invention is to provide in a double center drive crankshaft lathe a pair of rotary chucking devices each having plungers movable perpendicular to the axis of rotation of said devices to engage the rough irregular webs of a crankshaft to be chucked in said lathe and to provide means in at least one of said chucking devices comprising a fixed abutment means engaging a rough web of said crankshaft for positively driving the crankshaft during the cutting operation.

Another object of this invention is to provide means for engaging a rough irregular web of a prelocated crankshaft with a chucking device by presenting a plurality of radially moving plungers to initially engage said web with a pre-determined pressure insufficient to distort said web from its prelocated position and to provide means in conjunction with said plungers for automatically locking said plungers when engaged in said initial contact whereby said crankshaft may be securely held in positive engagement with the chucking device during the cutting operation to be performed on said crankshaft.

And still another object of the invention is to provide in a chuck, adapted to engage a rough irregular prelocated work piece, a series of equalizing plungers which are rapidly snapped into initial engagement with the rough surface of the work piece to thereby crush down any surface irregularities or other loose foreign matter to thus provide adequate bearing contact for said plungers on the work before they are locked rigidly with the rotatable chuck body.

Further features and advantages of this invention will be set forth in the following detailed description of the drawings in which:

Figure I is right hand end elevation, partly in section, of the center drive chucking device associated with the flange end of a crankshaft in a double center drive lathe as indicated by the line I—I of Figure V.

Figure II is a fragmentary section through the chucking device on the line II—II of Figure I.

Figure III is a right hand end elevation, partly in section, of the center drive chucking device associated with the stub end of a crankshaft in a double center drive lathe as indicated by the line III—III of Figure V.

Figure IV is a fragmentary section through the chucking device in the line IV—IV of Figure III.

Figure V is a diagrammatic view showing a crankshaft held on the centers and in the center drive chucks of a typical double center drive lathe.

Figure VI is an enlarged view of one of the latch pawls for holding the actuating wedges in inoperative position when loading or unloading work from the center drive chucks.

Each of the chucking devices of Figures I and III are applicable to a single center drive crankshaft lathe. They are also each adapted to be used as a pair in the ring gears of a double center drive lathe. More especially are these chucks adapted to be both used in a double center drive lathe having a pair of center drive ring gears 1 and 2 located between the usual centers 3 and 4 for supporting the ends of a crankshaft C.

The chucks in these ring gears 1 and 2 are shown arranged to chuck a typical four throw V-eight crankshaft C having the line bearings 5, 6, and 7 and associated flange and stub ends 8 and 9, the pin bearings 10, 11, 12, and 13 and the interconnecting webs 14 to 19 inclusive. The chuck of Figures I and II is shown engaging the web 18 which is near the flange end of the crankshaft C and for explanatory purposes this chuck will be called the flange end chuck. Similarly the chuck of Figures III and IV engages the web 15 and will be called the stub end chuck.

Referring particularly to Figures I and II in the bore 20 and counterbore 21 of the ring gear are fixed the semi circular plates 22 and 23 by suitable bolts 24. On these plates is fixed the abutment block 25 by suitable screws 26 which abuts against the side 27 of the web 18 of the crankshaft to provide a positive means to drive the crankshaft around with the ring gear 1. In appropriate guideways 28 and 29 in the plate 22 are slidably mounted the work engaging plungers 30, 31 and 32 having the respective abutment ends 33, 34 and 35 arranged to conform approximately with the shape of the rough web 18 of the crankshaft C. Behind these plungers 30, 31, and 32 are the respective arcuate actuating and locking wedges 36, 37, and 38 which can slide in an approximate accurate guideway 39 formed in the plate 22. The wedges 36 and 37 when urged clockwise in Figure I cause the plungers 30 and 31 to be forced toward the axis of rotation of the chuck by the engagement of their respective tapered surfaces 36a and 37a which slide against the rear ends of the plungers. Similarly the plunger 32 is actuated by the tapered face 38a of the wedge 38 when it is moved counter-clockwise in Figure I. Compression springs 40 having their ends carried in bores 41 in the facing ends of the wedges 36, 37 and 38 serve to normally urge the wedges against the plungers 30, 31 and 32 to actuate them toward a web 18 of the crankshaft C in the chuck. It is to be clearly understood that the tapered faces 36a, 37a, and 38a on these wedges is arranged so that pressure exerted against the plungers by the work during the cutting operation cannot move them radially outward away from the axis of the chuck. The springs 40 are carefully designed to move the wedges and the plungers against the work with a predetermined pressure depending upon the exact nature of the work piece of crankshaft C. In other words, the pressure exerted by the plungers is directly related to and is determined from the ability of the crankshaft to resist axial bending or distortion when supported on the lathe centers.

Fixed on studs 41 fixed in the bore 42 of the segmental gear 43 journaled in bearings 44 and 45 in plates 22 and 23 respectively is the bifurcated clamp 46 adapted to be swung astraddle the web 18 of the crankshaft C from a position 46a radially removed from the axis of the chuck.

In order to seat the plungers against the rough web 18 with a hammer blow effect means are provided to withdraw the wedges from behind the plungers and to latch them in said withdrawn position while loading and unloading the work from the chuck; tripping the latches to effect the rapid setting of the wedges and the plungers against the work when gripping it in the chuck. To do this the segmental gear 43 engages the segmental gear 47 rotatably mounted on a pin 48 fixed in the plates 22 and 23, this segmental gear 48 in turn engaging a segmental gear 49 rotatably mounted on a pin fixed in said plates. When the clamp 46 is swung clockwise to the loading and unloading position 46a the gears 48 and 50 with the respective integral projections 51 and 52 will be so rotated as to swing these projections toward each other whereupon they engage the faces 53 of the slots 54 of the wedges 36, 37 and 38 to withdraw said wedges from behind the plungers. When the wedges are in completely withdrawn position with the clamp at 46a, pawls 55 pivotally mounted on pins 56 fixed in the plates 22 and 23 are free to swing into appropriate notches 57 formed in the wedges under the influence of the twist springs 58 whereby these wedges are held in withdrawn position while the clamp 46 is being moved from position 46a to the clamping position. Just as the clamp 46 reaches the clamping position, as shown in Figure I, the projection 51 and 52 of the segmental gears 48 and 50 engage the pawls 55, releasing them from the notches 57 in the wedges thus allowing the wedges to snap forward under the influence of the spring 40 to thus properly seat the plungers 30, 31 and 32 against the rough crankshaft web 18.

In order to provide adequate stability for the clamp 46 its clamping screw 59 does not directly engage the surface 60 of the web 18 but engages the surface 61 of the abutment arm 62 which is pivotally mounted on a pin 63 which has limited vertical movement, Figure I, in the plates 22 and 23. Its surface 61 is perpendicular to the line of clamping pressure II—II through the center 64 of the studs 41 and the clamping screw 59 so as to prevent any swinging motion in the clamp 46 when the screw 59 is being tightened to chuck the work. Spaced work engaging faces 65 are shaped on the arm 62 to approximately fit the rough web 18. It will be apparent from Figure I that with this arrangement any horizontal movement of the crankshaft will have no effect of swinging the clamp 46 to dislocate it from proper clamping position, in fact, it has been found that engagement of the surfaces 65 of the arm 62 with the surface 60 of the web 18 is sufficient to prevent horizontal displacement of the crankshaft C (Figure I) since the arm 62 as mounted on the pin 63 has no horizontal movement as described. A tension spring 66 attached to the pin 67 in plates 22 and 23 and connected to the pin 68 fixed in the arm 62 serves to automatically swing the arms to the position 62A to facilitate loading and unloading the chuck.

The construction of the stub end chuck shown in Figures III and IV is substantially the same as that of the flange end chuck with the exception that in the stub end chuck a movable plunger 69 having an abutment end 70 and actuated by the arcuate wedge 71 is utilized in place of the fixed abutment block 25 of the flange end chuck. Either of these chucks may be used independently to properly support and rotate rough irregular work pieces in a single center drive lathe. The chuck of Figure I is best adapted to conditions where severe cutting strains are to be imposed in the work while the chuck of Figure III is entirely satisfactory where lighter strains and finishing operations are to be done on the work. These chucks are also especially adapted to be used together, for example, in a pair of synchronously rotatable ring gears of a double center drive lathe. In this latter case, the flange end chuck is engaged on the work first to properly seat the work against the fixed abutment block 25 before the stub end chuck is engaged on the work thus preventing any twisting of the crankshaft while at the same time providing a positive driving means for rotating the crankshaft while in said chucks.

The method of loading the crankshaft C in these chucks is as follows: The crankshaft is placed on the lathe centers or other equivalent means to align its axis with the axis of rotation of the chuck and then rotated manually with the chuck of Figure I until the face 27 of the web 18 is brought into contact with the abutment block 25. The arm 62 is then swung down to the surface 60 of the web 18 and the clamp 46 swung over the web and arm 62 thus causing the plungers to snap into proper work engaging position. The clamping screw 59 is then turned by a suitable socket wrench locking the chuck and work together. The chuck of Figure III is then operated as the former chuck, the work being already properly circumferentially positioned therein by the abutment block 25 of the former chuck. When the chuck of Figure III is used alone, the work is approximately positioned in correct circumferential position before actuating the chuck to grip the work.

Having thus fully set forth and described our invention what we claim as new and desire to secure by United States Letters Patent is:

1. In a lathe, centers for supporting a crankshaft in centered position in said lathe, a pair of center drive ring gears located between said centers, chucking mechanisms in said ring gears adapted to engage rough irregular webs of said crankshaft to support said crankshaft in its precentered position, and means in one of said ring gears to positively drive said crankshaft.

2. In a lathe, centers for supporting a crankshaft in centered position in said lathe, a pair of center drive ring gears located between said centers, chucking mechanism in each of said ring gears each adapted to engage a rough irregular web of said crankshaft to support said crankshaft in its precentered position, and a fixed abutment in one of said ring gears adapted to engage a rough web of said crankshaft to positively drive said crankshaft.

3. In a chucking device adapted to engage a rough, irregular surface of a prelocated work piece in a lathe, a rotatable chuck body, fixed abutment means on said chuck body to drive said work piece, movable gripping members in said body adapted to engage said work piece with a predetermined relatively light pressure, and means for locking said plungers to said body when in engaged position with said work piece.

4. In a chucking device adapted to engage a rough, irregular surface of a prelocated work piece in a lathe, a rotatable chuck body, fixed abutment means on said chuck body engaging said surface to drive said work piece, radially moving gripping members in said body adapted to engage said work piece with a predetermined relatively light pressure, and means for locking said members to said body when engaged with said work piece, and clamping means on said chuck body to hold said work piece against said members when locked to said chuck body.

5. In a chucking device adapted to engage a rough, irregular surface of a prelocated work piece in a lathe, a rotatable chuck body, fixed abutment means on said chuck body engaging said surface to drive said work piece, movable gripping members in said body adapted to engage said work piece with a predetermined relatively light pressure, clamping means on said chuck body, and means for automatically locking said gripping members to said chuck body when said clamping means is engaged with said work piece to hold it in engagement with said members.

6. In a chucking device adapted to engage a rough, irregular surface of a prelocated work piece in a lathe, a rotatable chuck body, movable gripping members in said body adapted to engage said work piece with a predetermined relatively light pressure, clamping means on said chuck body, and means for automatically locking said gripping members to said chuck body when said clamping means is engaged with said work piece to hold it in engagement with said members.

7. In a chucking device adapted to engage a rough, irregular surface of a prelocated work piece in a lathe, a rotatable chuck body, radially moving gripping members in said body adapted to engage said work piece with a predetermined relatively light pressure, and means for locking said plungers to said body when engaged with said work piece, and clamping means on said chuck body to hold said work piece against said members when locked to said chuck body.

8. In a chucking device adapted to engage a rough, irregular surface of a prelocated work piece in a lathe, a rotatable chuck body, movable gripping members in said body adapted to engage said work piece with a predetermined relatively light pressure, and means for locking said plungers to said body when in engaged position with said work piece.

9. In a chucking device adapted to engage a rough, irregular surface of a prelocated work piece in a lathe, a rotatable chuck body, radially movable gripping plungers in said chuck body, means for rapidly engaging said plungers with said surface with a predetermined relatively light pressure, means for locking said plungers to said chuck body when engaged with said work, and clamping means adapted to be brought into engagement with said work piece to hold it against said plungers when locked to said chuck body.

10. In a chucking device adapted to engage a rough, irregular surface of a prelocated work piece in a lathe, a rotatable chuck body, radially movable gripping plungers in said chuck body, means for rapidly engaging said plungers with said surface with a predetermined relatively light pressure, means for locking said plungers to said chuck body when engaged with said work, and clamping means effective to render said first mentioned means operative when brought into engagement with said work piece to hold it against said plungers when locked to said chuck body.

11. In a chucking device adapted to engage a rough, irregular surface of a prelocated work piece in a lathe, a rotatable chuck body, radially movable gripping plungers in said chuck body, means for rapidly engaging said plungers with said surface with a predetermined relatively light pressure, means for locking said plungers to said chuck body when engaged with said work and clamping means adapted to be brought into engagement with said work piece to hold it against said plungers when locked to said chuck body and effective when moved from engagement with said work piece to render said second mentioned means inoperative.

12. In a chucking device adapted to engage a rough, irregular surface of a prelocated work piece in a lathe, a rotatable chuck body, radially movable gripping plungers in said chuck body, means for rapidly engaging said plungers with said surface with a predetermined relatively light pressure, means for locking said plungers to said chuck body when engaged with said work, and clamping means effective to render said first mentioned means operative when brought into engagement with said work piece to hold said work against said plungers when locked to said chuck body, said clamping means also being effective when moved from engagement with said work piece to render said second mentioned means inoperative.

13. In a chucking device adapted to engage a rough, irregular surface of a prelocated work piece in a lathe, a rotatable chuck body, plungers movable in said chuck body to and from engagement with said work piece, actuating wedges behind said plungers, means for rapidly actuating said wedges to move said plungers rapidly against said work said wedges being so constructed as to automatically prevent movement of said plungers away from said work, and means for withdrawing said wedges from behind said plungers when loading and unloading work in said chuck.

14. In a chucking device adapted to engage a rough, irregular surface of a prelocated work piece in a lathe, a rotatable chuck body, plungers movable in said chuck body to and from engagement with said work piece, actuating wedges behind said plungers, means for rapidly actuating said wedges to move said plungers rapidly against said work said wedges being so constructed as to automatically prevent movement of said plungers away from said work, means for withdrawing said wedges from behind said plungers and for latching said wedges in withdrawn position when loading and unloading work in said chuck.

15. In a chucking device adapted to engage a rough, irregular surface of a prelocated work piece in a lathe, a rotatable chuck body, plungers movable in said chuck body to and from engagement with said work piece, actuating and locking wedges behind said plungers, resilient means to normally urge said wedges against said plungers, clamping means on said chuck body to hold said work piece against said plungers, means actuated by movement of said clamp from work engaging position to withdraw said wedges from behind said plungers, means to latch said wedges in withdrawn position, and means actuated by movement of said clamp to work engaging position to trip said latch means to allow said wedges to snap into engagement with said plungers to seat them against said work piece in hammer blow fashion.

16. In a chucking device adapted to engage a rough, irregular surface of a prelocated work piece in a lathe, a rotatable chuck body, plungers movable in said chuck body to and from engagement with said work piece, actuating and locking wedges behind said plungers resilient means to normally urge said wedges against said plungers, clamping means on said chuck body to hold said work piece against said plungers, means to withdraw said wedges from behind said plungers, means to latch said wedges in withdrawn position, and means to trip said latch means to allow said wedges to snap into engagement with said plungers.

17. In a chucking device for a lathe, a rotatable chuck body, a clamp mounted on said body, and a clamping abutment mounted on said body adapted to engage a work piece in said lathe and to receive the clamping pressure of said clamp, said clamping abutment being movable on said chuck body when clamped on said work in a plane parallel with the line of clamping pressure of said clamp.

18. In a chucking device for a lathe, a rotatable chuck body, a clamp pivotally mounted on said body for swinging to or from clamping position relative to a work piece in said lathe and a clamping abutment pivotally mounted on said body for swinging to or from work engaging position, said pivotal mounting being slidable in a plane parallel with the line of clamping pressure of said clamp on said abutment and work piece.

WILLIAM F. GROENE.
WALTER R. MEYER.